United States Patent [19]

Imokawa

[11] Patent Number: 5,175,726
[45] Date of Patent: Dec. 29, 1992

[54] DISK CARTRIDGE WHICH ALLOWS MEDIA WITHIN TO TILT

[75] Inventor: Naoki Imokawa, Tokyo, Japan

[73] Assignee: Canon Kabushiki Kaisha, Tokyo, Japan

[21] Appl. No.: 742,156

[22] Filed: Aug. 1, 1991

Related U.S. Application Data

[63] Continuation of Ser. No. 407,431, Sep. 6, 1989, abandoned.

[30] Foreign Application Priority Data

Sep. 9, 1988 [JP] Japan .................. 63-226173
Sep. 9, 1988 [JP] Japan .................. 63-226174

[51] Int. Cl.$^5$ .............. G11B 23/03; G11B 3/70; G11B 5/84; G11B 7/26
[52] U.S. Cl. .................... 369/291; 360/133
[58] Field of Search .......... 369/291, 292; 360/133, 360/135; 206/444

[56] References Cited

U.S. PATENT DOCUMENTS 4,609,105 9/1986 Manes et al. .................. 206/444
4,797,770 1/1989 Takahashi .................... 369/291

FOREIGN PATENT DOCUMENTS 0299783 1/1989 European Pat. Off. .
0022294 2/1980 Japan .................. 369/291
55-4710 3/1980 Japan .
60-40581 7/1985 Japan .
233481 3/1987 Japan .
62-33385 7/1987 Japan .

*Primary Examiner*—Eugene R. LaRoche
*Assistant Examiner*—Michael Kessell
*Attorney, Agent, or Firm*—Fitzpatrick, Cella, Harper & Scinto

[57] ABSTRACT

A disk cartridge comprises a disk-like information recording medium and a containing portion containing the recording medium in the cartridge. The containing portion is shaped complementary to the configuration of the medium, and formed with a stepped portion inside the outer periphery of the containing portion and formed with a wall portion near the central portion of the containing portion, with the wall portion being higher than the stepped portion.

7 Claims, 5 Drawing Sheets

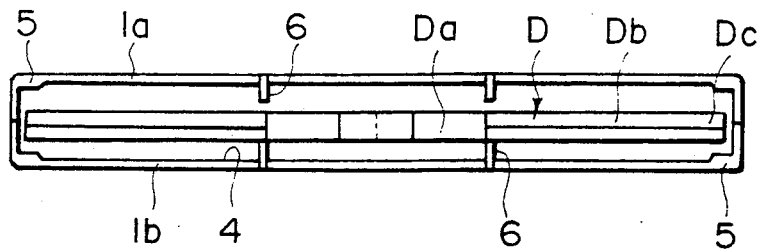
F I G. 2
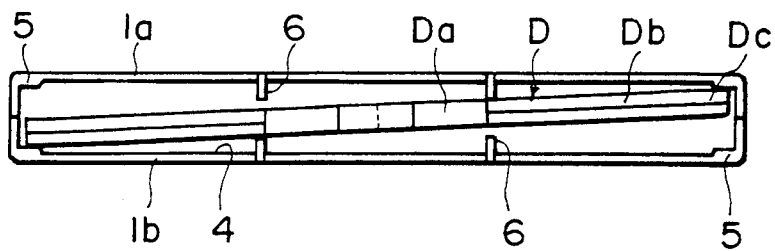
F I G. 3
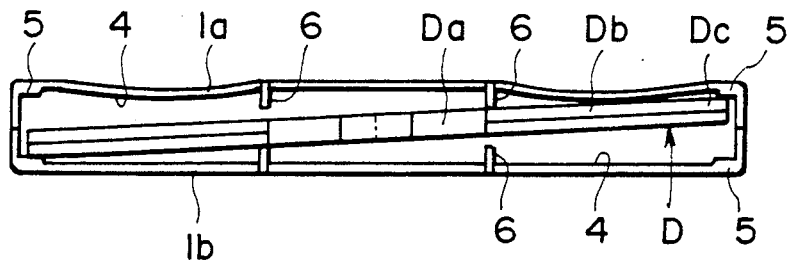
F I G. 4
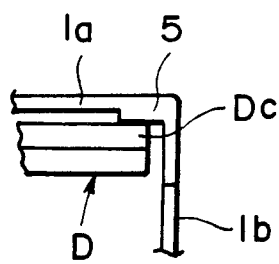
F I G. 5

DISK CARTRIDGE WHICH ALLOWS MEDIA WITHIN TO TILT-

This application is a continuation of application Ser. No. 07/407,431 filed Sep. 6, 1989, now abandoned.

BACKGROUND AND SUMMARY OF THE INVENTION

This invention relates to a disk cartridge made into a cassette so as to be mounted on a drive device with a disk-like recording medium contained therein.

In recent years, optical disks have been utilized as information recording mediums in the field of the custoday of information and data. An optical disk has a recording surface on the front surface thereof and has both surfaces covered with protective coatings. An optical signal such as a laser light is used to read information from the recording surface of the disk, and therefore when a flaw or flaws, e.g., dust, stains, etc. are present on the surfaces of the protective coatings, reading of information becomes impossible. So it is known to contain the disk within a case, but it is inconvenient to put the disk into and out of the case each time the disk is used, and directly touching the disk with the hand leads to the possibility of imparting a flaw or flaws such as dust, stains, etc. to the disk. In order to prevent this, disk cartridges with a shutter mechanism which can be used without being put into and out of a case are used nowadays.

However, since the optical disk is rotated while being contained in a disk cartridge, the dimensions of the inner wall of the disk containing portion must be made sufficiently greater than the outer diameter of the disk with the amount of eccentricity between the disk and rotating portion of a recording-reproducing apparatus taken into account. Also, during transportation or the like of the cartridge, the disk may slidingly contact with the inner surface of the cartridge, whereby the disk may be injured or scraped, rendering reading of the information on the disk impossible.

As a method for solving such problem, there is a method of designing a stepped portion on the inner surface of the disk containing portion at such a position that will bear against only the inner peripheral portion and/or the end portion of the disk which is a non-recording portion. The stepped portion causes the disk to float up from the inner surface of the cartridge and hold the disk. However, where a stepped portion is provided on the inner peripheral surface of the disk containing portion at such a position that will bear against only the inner peripheral portion of the disk, an extraneous shock applied to an upper case can distort the upper case and the recording portion on the outer peripheral portion of the disk will contact with the inner surface of the cartridge and damage the disk. Where a stepped portion is provided on the inner surface of the disk containing portion at such a position that will bear against only the end portion of the disk, an extraneous shock applied to the upper case will distort the upper case and the recording portion on the inner peripheral portion of the disk will contact the inner surface of the cartridge and damage the disk.

It is the object of the present invention to eliminate the above-noted disadvantages and to provide a disk cartridge which can contain a disk therein without the inner surface of the cartridge contacting the recording portion of the disk and which is simplified in internal structure and can be manufactured at a low cost.

The gist of the present invention for achieving the above object is a disk cartridge for containing a disk-like recording medium therein, characterized in that a stepped portion is provided on the inner portion of the outer periphery of a circular disk containing portion along the configuration of said medium, a wall portion is formed near the central portion of said disk containing portion, and said will portion is made higher than said stepped portion.

BRIEF DESCRIPTION OF THE DRAWINGS

FIGS. 2, 3, 4 and 6 are cross-sectional views showing an embodiment of the disk cartridge according to the present invention.

FIG. 5 is an enlarged cross-sectional view of a portion of the cross-sectional view shown in FIG. 4.

DESCRIPTION OF THE PREFERRED EMBODIMENTS

Figure 1:
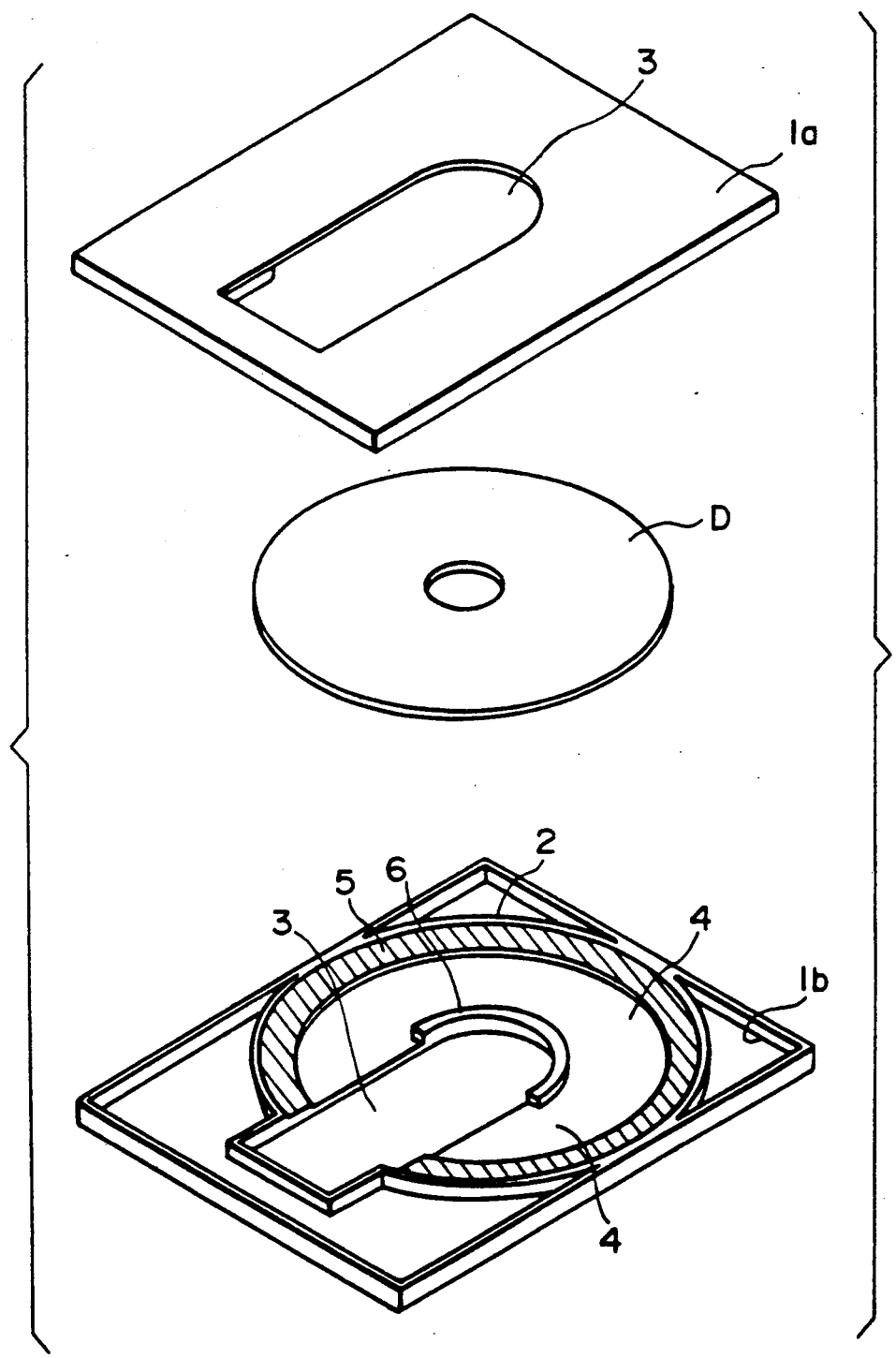
FIG. 1 is an exploded perspective view showing an embodiment of a disk cartridge according to the present invention.

The present invention will hereinafter be described in detail with respect to some embodiments thereof shown in the drawings.

Referring to FIG. 1, which is an exploded perspective view schematically illustrating the disk cartridge of the present invention, a lower case 1a and an upper case 1b, which are substantially of the same shape, are adhesively secured or screw-set to each other with an optical disk D interposed therebetween. The disk D is contained in the containing portion of a case inside a circular inner wall 2 along the configuration of the disk. That is, the disk D is contained in the concave containing portion of the case. Openings 3 for effecting the recording and reading of information on the disk D are formed in the lower case 1a and the upper case 1b, and a shutter mechanism, not shown, is mounted in the openings 3. A stepped portion 5 is provided on an inner surface 4 along the inner side of the circular inner wall 2 of the disk containing portion, and a semi-arcuate convex wall portion 6 is provided around the opening 3 which is in the vicinity of the central portion of the disk containing portion. The wall portion 6 is greater in height than the stepped portion 5. In other words, the case has a circular concave portion for containing the disk therein, and this concave portion has a level difference portion provided near the outer peripheral portion thereof, and has a convex portion provided near the central portion thereof. The height of said convex portion relative to the bottom surface of said concave portion is greater than the height of said level difference portion.

FIGS. 2, 3 and 4 are cross-sectional views of the cartridge as it contains the disk D therein. FIG. 2 shows the state during the normal time, FIG. 3 shows the state when the disk is inclined, and FIG. 4 shows the state when shock is applied to the cartridge. FIG. 5 is an enlarged cross-sectional view of a corner portion of the upper case 1b. FIG. 2 shows the state of the disk D when the cartridge is placed horizontally. When the disk D is being contained horizontally in the disk containing portion, the disk D contacts with the wall portion 6, but does not contact with the stepped portion 5. FIG. 3 shows that when the disk is inclined, the wall portion 6 only contacts with the non-recording portion Da on the inner peripheral portion of the disk D and the stepped portion 5 only contacts with the non-recording portion Dc at the end edge of the disk D, and that the recording portion Db of the disk D does not contact with the inner surface 4 of the cartridge.

As shown in FIG. 4, when an extraneous shock is applied to the upper case 1b, the upper case 1b itself is distorted and at the same time, the disk D is also momentarily distorted. So, the cartridge of the present invention is provided in the outer peripheral portion thereof with the stepped portion 5 lower than the wall portion 6 of the inner peripheral portion of the inner surface 4, whereby the disk D and the inner surface 4 has a predetermined angle therebetween. As shown in FIG. 5, even if the disk D is inclined, it will only cause the collision of the non-recording portion Dc at the outer edge of the disk D. If the wall portion on the inner peripheral portion and the stepped portion on the outer peripheral portion are of the same height, the disk will be held parallel to the inner surface, and due to the eccentricity during the rotation of the disk, the stepped portion on the outer peripheral portion of the disk containing portion may slidingly contact with the outer peripheral portion of the disk to damage the disk or produce scrape powder of the disk and the cartridge, thereby making the reading of information impossible. But, in the present invention there is no such fear because the wall portion on the inner peripheral portion is higher than the stepped portion on the outer peripheral portion.

The specific dimensions of the cartridge will now be described with reference to FIG. 6. The thickness H of the cartridge is H=11 mm, the thickness I of the disk is I=2.5 mm, the thickness J of the case is J=2.5 mm, the clearance K between the disk and the wall portion on the inner peripheral portion is K=2 mm, the height L of the wall portion on the inner peripheral portion from the surface of the case is L=0.75 mm, the height M of the stepped portion on the outer peripheral portion from the surface of the case is M=0.4 mm, the difference L−M between the heights of the wall portion and the stepped portion is L−M=0.35 mm, the distance N between the end surface of the outer peripheral side of the disk and the end surface of the inner peripheral side of the stepped portion when the center of the disk is coincident with the center of the containing portion of the cartridge is N=0.3 mm, and the distance O between the center of the containing portion of the cartridge and the wall portion on the inner peripheral portion is O=22 mm. Here, the difference L−M between the heights of the wall portion and the stepped portion may preferably be 0.1 mm$\leq$L−M$\leq$1.0 mm. If L−M is smaller than 0.1 mm, the stepped portion on the outer peripheral portion will contact with the outer peripheral portion of the disk due to the eccentricity during the rotation of the disk to thereby injure the disk, and if L−M is greater than 1.0 mm, when an extraneous shock is applied to the case, the surface of the case will contact the recording portion of the disk to damage the recording portion of the disk. Also, the distance N between the end surface of the outer peripheral side of the disc and the end surface of the inner peripheral side of the stepped portion may preferably be 0.1 mm=$\leq$N$\leq$0.5 mm. If N is smaller than 0.1 mm, the corner of the end surface of the outer peripheral side of the disk may contact the corner of the end surface of the inner peripheral side of the stepped portion, whereby the disk or the cartridge may be broken or the scrape powder of the disk and the cartridge may be produced to make the reading of information impossible. If N is greater than 0.5 mm, the stepped portion on the outer peripheral portion of the containing portion may contact the recording portion on the outer peripheral portion of the disk to damage the recording portion.

As described above, the disk cartridge according to the present invention is provided with a stepped portion inside the outer peripheral portion of the disk containing portion and with a wall portion higher than the stepped portion near the central portion of the disk containing portion. Thus, it is possible to contain the disk without the recording portion of the disk being brought into contact with the inner surface of the cartridge, making the disk hard to damage.

Another embodiment of the disk cartridge according to the present invention will now be described.

Figure 7:
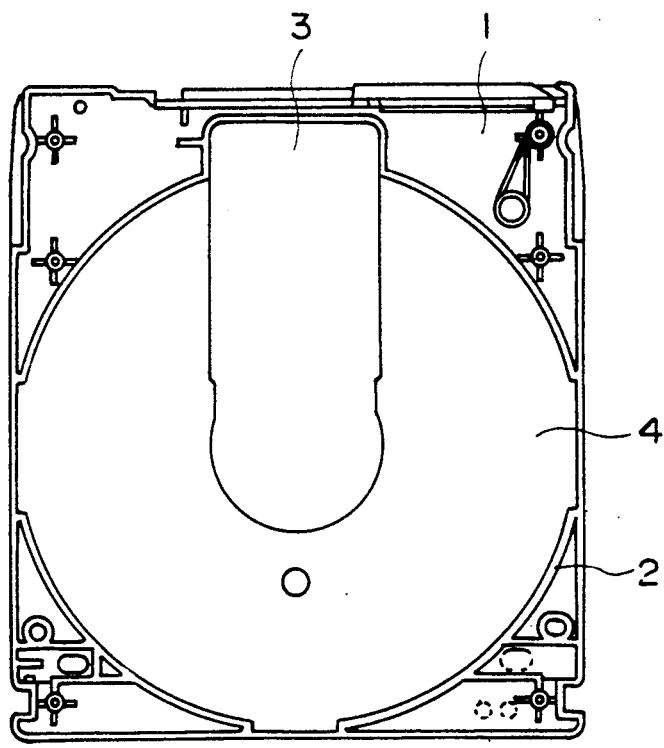
FIG. 7 is a plan view showing another embodiment of the disk cartridge according to the present invention.
Figure 8:
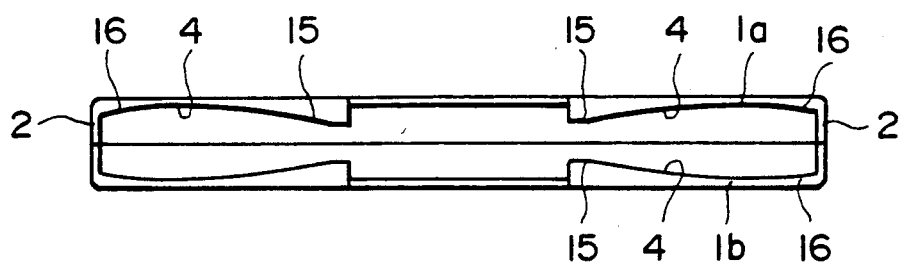
FIG. 8 is a cross-sectional view of the cartridge shown in FIG. 7.

FIG. 7 is a plan view of the inner side of a disk cartridge 1 containing a disk therein, and FIG. 8 is a cross-sectional view thereof. The disk cartridge 1 is formed into a thin box shape by two cases 1a and 1b of substantially the same shape being united together. The disk cartridge 1 is formed with a circular inner wall 2 surrounding the disk and extending along the configuration of the disk, and a rectangular shutter opening 3. A shutter mechanism, not shown, is mounted in the opening 3. The interior of the circular inner wall 2 provides a disk containing portion, and the inner diameter of the inner wall 2 is made greater than the outer diameter of the disk so as not to hinder the rotation of the disk. Also, as shown in FIG. 8, the thickness of the inner surface 4 of the disk containing portion is made into a smooth concave curve thickened toward the inner peripheral portion 15 and the outer peripheral portion 16 of the inner wall 2, with the inner peripheral portion 15 being thicker than the outer peripheral portion 16.

Figure 9:
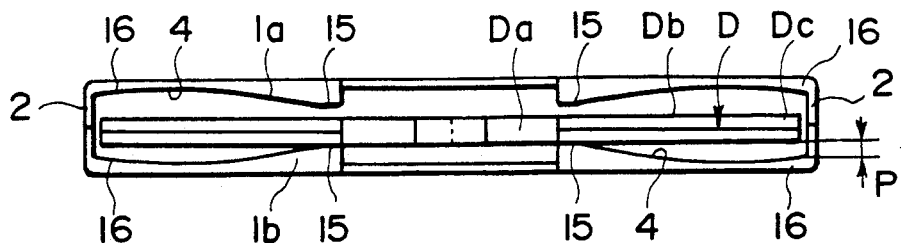
FIGS. 9 and 10 are cross-sectional views of the disk cartridge when it contains a disk therein.

FIG. 9 shows the state of the disk D when the cartridge is placed horizontally. When the disk D is thus contained horizontally in the disk containing portion, the disk D contacts the inner peripheral portion 15 of the containing portion, but does not contact the outer peripheral portion 16.

As shown, the inner surface 4 of the disk containing portion has a portion made into a concavely curved surface which approaches the disk D toward the inner peripheral surface 15 and the outer peripheral surface 16.

Also, the disk containing portion has a portion made into a concavely curved surface which becomes thicker toward the inner peripheral portion 15 and the outer peripheral portion 16, and the thickness of the inner peripheral portion 15 is greater than the thickness of the outer peripheral portion 16.

Figure 6:
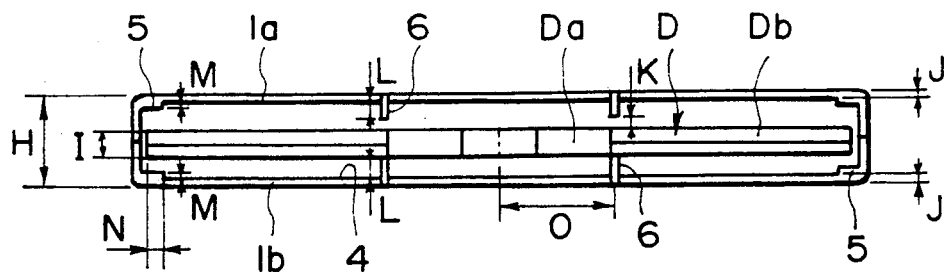

Here, the difference P between the thickness of the inner peripheral portion 15 and the thickness of the outer peripheral portion 16, as in the embodiment shown in FIG. 6, may preferably be 0.1 mm$\leq$P$\leq$1.0 mm. If P is smaller than 0.1 mm, the outer peripheral portion 16 will contact the outer peripheral portion of the disk due to the eccentricity during the rotation of the disk to damage the disk, and if P is greater than 1.0 mm, when an extraneous shock is applied to the case, the surface of the case will contact the recording portion of the disk to damage the recording portion of the disk.

Figure 10:
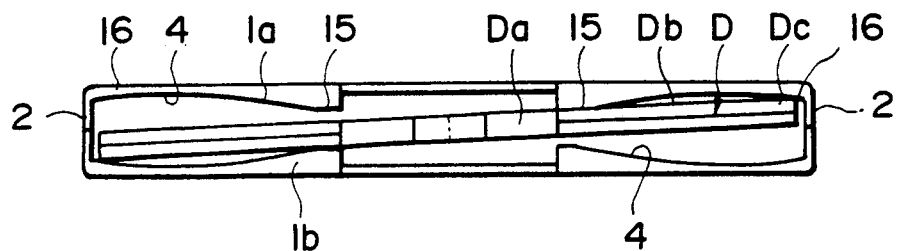

Referring to FIG. 10, which is a cross-sectional view showing a state in which the disk D is inclinedly contained, the disk D is nipped by and between two cases 1a and 1b. However, in the disk containing portion surrounding the disk D, there is play with respect to the diametrical direction of the disk D and a direction perpendicular to the diameter of the disk, and the disk D does not contact any portion of the inner surface 4 when the disk D is mounted and rotated on the rotating portion of a drive device.

Also, when the disk is not mounted on the drive device, in whatever direction the disk cartridge 1 may be inclined, only the inner peripheral portion Da or the peripheral end portion Dc of the disk D contact the inner peripheral portion 15 or the outer peripheral portion 16, respectively, of the inner surface 4. In addition, the recording portion Db intermediate of the inner peripheral portion Da and the peripheral end portion Dc do not contact the inner surface 4.

Figure 11A:
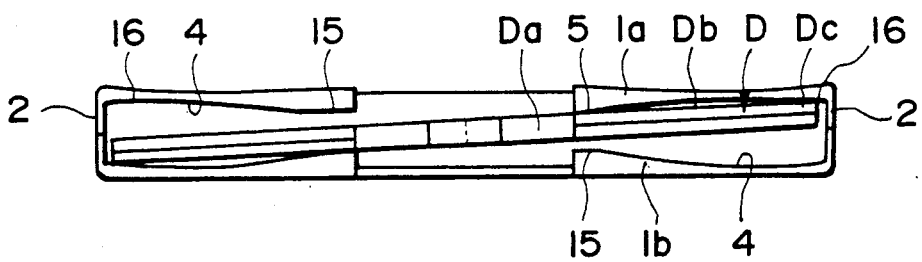
FIG. 11A is cross-sectional view when a shock is applied to the disk cartridge.
Figure 11B:
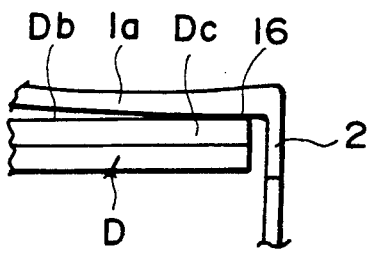
FIG. 11B is an enlarged cross-sectional view of the resulting corner portion.

Further, even when the disk cartridge 1 is momentarily deformed as shown in FIG. 11A by a shock such as a fall, the peripheral end portion Dc of the disk D will first collide against the outer peripheral portion 16 of the inner surface 4 because the inner surface 4 is made into a smooth concave curve. The curve becomes thicker toward the inner peripheral portion 15 and the outer peripheral portion 16 of the inner wall and the inner peripheral portion 15 is thicker than the outer peripheral portion 16. Thus, the recording portion Db of the disk D will be saved from contacting with the inner surface 4.

Thus, in a disk cartridge containing therein a disk-like recording medium formed with a recording portion thereon, the inner surface of the disk containing portion surrounding the recording medium is constructed so as to have a portion made into a concavely curved surface which becomes thicker inside the cartridge toward the inner peripheral portion and the peripheral end portion. Furthermore, the inner peripheral portion is thicker than the peripheral end portion, whereby the disk can be contained in the cartridge without the inner surface of the cartridge contacting with the recording portion of the disk. Also, if the inner surface of the disk containing portion of the cartridge is made into a curved surface, stress concentrating in a part of the containing portion can be avoided.

Figure 12:
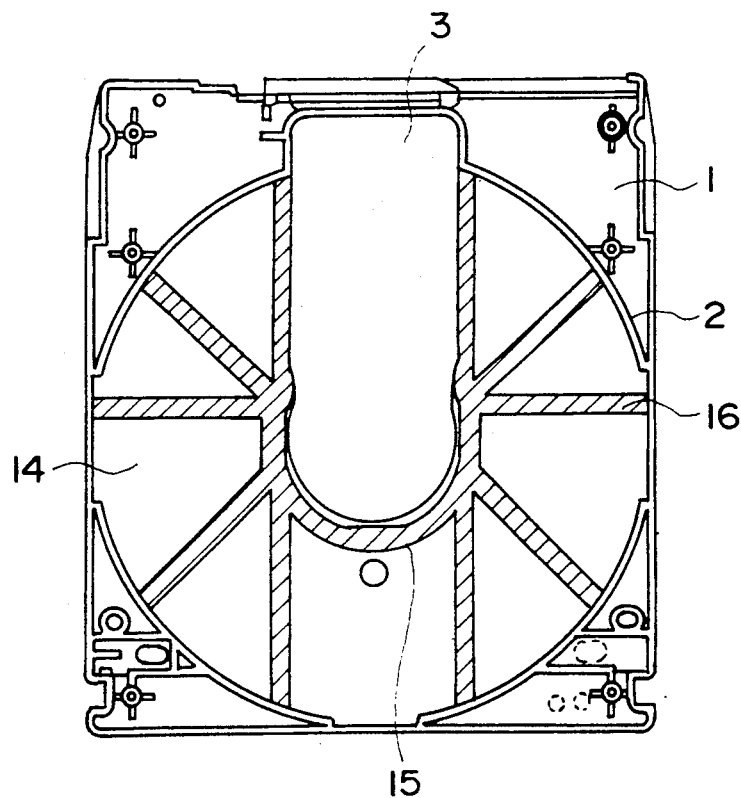
FIGS. 12 and 13 are plan views of the inner surfaces of disk cartridges.
Figure 13:
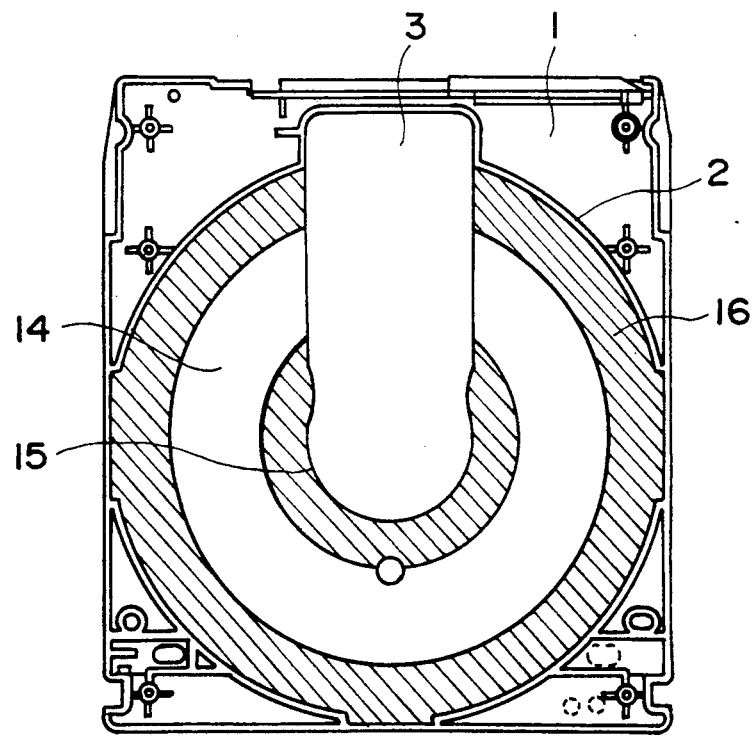

FIGS. 12 and 13 are plan views of the inner surfaces of disk cartridges according to further embodiments. Only that portion of the inner surface 14 of the containing portion which is indicated by hatching, as in the embodiment shown in FIGS. 7 and 8, is formed into a concavely curved surface which becomes thicker inside the cartridge toward the inner peripheral portion 15 and the outer peripheral portion 16, and the other portions are planar. That is, this cartridge is of such structure that a portion of the inner surface of the disk containing portion is made into a concavely curved surface which becomes thicker inside the cartridge toward the inner peripheral portion and the peripheral end portion, and a concavely curved surface which becomes thicker inside the cartridge toward the inner peripheral portion and the peripheral end portion is provided near the inner peripheral portion and the peripheral end portion of the inner surface of the disk containing portion. Again in these embodiments, as in the embodiment shown in FIGS. 7 and 8, the inner peripheral portion is made thicker than the peripheral end portion, whereby the disk can be contained in the cartridge without the inner surface of the cartridge contacting with the recording portion of the disk.

As described above, the entire part or a section of the inner surface of the containing portion of the disk cartridge which surrounds the disk is constructed of a concavely curved surface and the inner peripheral portion of the inner surface of the containing portion is made thicker than the peripheral end portion, whereby contact of the inner surface of the cartridge with the recording portion of the disk can be prevented to thereby protect the disk from damage.

I claim:

1. A disk cartridge, comprising:
    an upper plate;
    a lower plate;
    a disk-like recording medium having a thickness d, wherein said upper and lower plates define a space for containing said recording medium with the containing space being shaped into a form corresponding to an outer shape of said recording medium, and having
    a first containing space portion with a height $h_1$ formed around an outer peripheral portion of the containing space by first stepped portions provided on said upper and lower plates, said first stepped portions being substantially equal in shape to each other; and
    a second containing space portion having a height $h_2$ formed substantially at an inner peripheral portion of the containing space by second stepped portions provided on said upper and lower plates, said second stepped portions being substantially equal in shape to each other and providing a gap between said recording medium and one of said second stepped portions for permitting tilting of said recording medium; and
    slidable shutter means, disposed on either of said upper and lower plates, for exposing surface and a center hole of said disk-like recording medium during a recording mode and covering the surface and center hole of said disk-like recording medium in a non-recording mode, wherein
    height $h_2$ is less than $h_1$ and greater than thickness d in both the recording and non-recording modes, and the gap between said recording medium and said second stepped portions exists in both the recording and non-recording modes.

2. A disk cartridge according to claim 1, wherein the difference between the heights of said first and second containing space portions is equal to or greater than 0.2 mm and is equal to or less than 2.0 mm.

3. A disk cartridge according to claim 1, wherein said containing space has an opening and said second stepped portion is semi-arcuately shaped around the opening.

4. A disk cartridge case, comprising:
    an upper plate;
    a lower plate, wherein
    said upper and lower plates define a space for containing a recording medium having a thickness d, the containing space being shaped into a form corresponding to an outer shape of the recording medium, and having a first containing space portion having a height $h_1$ formed in an outer peripheral portion of the containing space by first stepped portions provided on said upper and lower plates, with said first stepped portions being substantially equal in shape to each other, and a second containing space portion having a height $h_2$ formed in an inner peripheral portion of the containing space by second stepped portions, said second stepped portions provided on said upper and lower plate, being substantially equal in shape to each other and providing a gap between the recording medium and one of said second stepped portions for permitting tilting of the recording medium; and slidable shutter means, disposed on either of said upper and lower plates, for exposing a surface and a center hole of the disk-like recording medium during a recording mode and covering the surface and center hole of the disk-like recording medium in a non-recording mode, wherein height $h_2$ is less than $h_1$ and greater than thickness d in both the recording and non-recording modes, and the gap between the recording medium and said second stepped portions exists in both the recording and non-recording modes.

5. A disk cartridge, comprising:

an upper plate;

a lower plate;

a disk-like recording medium having a thickness d, wherein said upper and lower plates define a space for containing said recording medium, with the containing space being shaped in a form corresponding to an outer shape of said recording medium and having concavely curved portions provided on said upper and lower plates, with said concavely curved portions each getting closer to said recording medium as they approach toward an inner peripheral portion and an outer peripheral portion of the containing space, and said concavely curved portions being equal in shape to each other, with a height $h_2$ between the inner peripheral portions being less than a height $h_1$ between the outer peripheral portions and being greater than the thickness d of said recording medium, and providing a gap between said recording medium and said inner peripheral portions for permitting tilting of said recording medium; and slidable shutter means, disposed in either of said upper and lower plates, for exposing a surface and a center hole of said disk-like recording medium during a recording mode and covering the surface and center hole of said disk-like recording medium in a non-recording mode, wherein height $h_2$ is less than $h_1$ and greater than thickness d in both the recording and non-recording modes, and the gap between said recording medium and said inner peripheral portions exists in both the recording and non-recording modes.

6. A disk cartridge according to claim 5, wherein the difference between the heights of said inner circumference portions and said outer circumference portions is equal to or greater than 0.2 mm and is equal to or less than 2.0 mm.

7. A disk cartridge case, comprising:

an upper plate;

a lower plate, wherein said upper and lower plates define a space for containing a recording medium having a thickness d, with the containing space being shaped into a form corresponding to an outer shape of the recording medium, and having a concavely curved portions each getting closer to the recording medium as they approach toward an inner peripheral portion and an outer peripheral portion of the containing space, with said concavely curved portions being equal in shape to each other and a height $h_2$ between the inner circumference portions being less than a height $h_1$ between the outer circumference portions and being greater than the thickness d of the recording medium, and providing a gap between the recording medium and said inner peripheral portion for permitting tilting of the recording medium; and slidable shutter means, disposed in either of said upper and lower plates, for exposing a surface and a center hole of the disk-like recording medium during a recording mode and covering the surface and center hole of said disk-like recording medium in a non-recording mode, wherein height $h_2$ is less than $h_1$ and greater than thickness d in both the recording and non-recording modes, and the gap between the recording medium and said inner peripheral portions exists in both the recording and non-recording modes.

* * * * *

UNITED STATES PATENT AND TRADEMARK OFFICE
CERTIFICATE OF CORRECTION

PATENT NO. : 5,175,726

DATED : December 29, 1992

INVENTOR(S) : Naoki Imokawa

It is certified that error appears in the above-identified patent and that said Letters Patent is hereby corrected as shown below:

<u>COLUMN 1</u>:

Line 3, "TILT-" should read --TILT--.
    Line 15, "day" should read --dy--.

<u>COLUMN 4</u>:

Line 6, "0.1 mm = $\leqq$ N $\leqq$ 0.5" should read --0.1 mm $\leqq$ N $\leqq$ 0.5--

<u>COLUMN 6</u>:

Line 9, "with" should be deleted.
    Line 60, "said" should be deleted.
    Line 61, "containing space has an opening and" should be deleted.

<u>COLUMN 8</u>:

Line 26, "a" should be deleted.

Signed and Sealed this

Eleventh Day of January, 1994

*Attest:*

BRUCE LEHMAN

*Attesting Officer*     *Commissioner of Patents and Trademarks*